US006964702B2

(12) United States Patent
Shen et al.

(10) Patent No.: US 6,964,702 B2
(45) Date of Patent: Nov. 15, 2005

(54) INK SET FOR INKJET PRINTERS

(75) Inventors: Yu-Chang Shen, Taoyuan (TW); In-Shan Sir, Taoyuan (TW); Chia-Hsin Chien, Taoyuan (TW); Yun-I Liu, Taoyuan (TW); Yu-Ting Lin, Taoyuan (TW)

(73) Assignee: Benq Corporation, Taoyuan (TW)

( * ) Notice: Subject to any disclaimer, the term of this patent is extended or adjusted under 35 U.S.C. 154(b) by 87 days.

(21) Appl. No.: 10/418,783

(22) Filed: Apr. 18, 2003

(65) Prior Publication Data

US 2003/0196570 A1 Oct. 23, 2003

(30) Foreign Application Priority Data

Apr. 18, 2002 (TW) ........................................ 91107946 A
Apr. 15, 2003 (TW) ........................................ 92108735 A

(51) Int. Cl.[7] ............................................ X09D 11/02
(52) U.S. Cl. ............................... 106/31.59; 106/31.58; 106/31.86; 106/31.89
(58) Field of Search ........................... 106/31.59, 31.58, 106/31.86, 31.89; 347/100

(56) References Cited

U.S. PATENT DOCUMENTS

| | | | | |
|---|---|---|---|---|
| 5,536,306 A | * | 7/1996 | Johnson et al. | 106/31.49 |
| 5,626,655 A | * | 5/1997 | Pawlowski et al. | 106/31.27 |
| 5,730,790 A | * | 3/1998 | Rehman | 106/31.59 |
| 5,749,951 A | | 5/1998 | Yoshiike et al. | 106/31.27 |
| 6,036,759 A | * | 3/2000 | Wickramanayake et al. | 106/31.28 |
| 6,051,645 A | * | 4/2000 | Suzuki et al. | 524/500 |
| 6,706,104 B2 | * | 3/2004 | Takuhara et al. | 106/31.6 |
| 2003/0081086 A1 | * | 5/2003 | Suzuki et al. | 347/86 |

FOREIGN PATENT DOCUMENTS

| | | |
|---|---|---|
| CN | 1242400 A | 1/2000 |
| CN | 1082072 C | 4/2003 |

* cited by examiner

*Primary Examiner*—Helene Klemanski
(74) *Attorney, Agent, or Firm*—Ladas & Parry LLP

(57) ABSTRACT

An ink set for an inkjet printer comprises a first ink and at least one second ink. The first ink comprises at least one first colorant, a first media, and at least one first non-ionic surfactant. The first media comprises water. The at least one first non-ionic surfactant has a first HLB (Hydrophilic Lipophilic Balance) value. The at least one second ink comprises at least one second colorant, a second media, and at least one second non-ionic surfactant. The at least one second colorant provides corresponding color of the second ink. The second media comprises water. The at least one second non-ionic surfactant has a second HLB value. The first HLB value is smaller than or equal to the second HLB value.

31 Claims, 9 Drawing Sheets

INK SET FOR INKJET PRINTERS

BACKGROUND OF THE INVENTION

1. Field of the Invention

The present invention relates to ink set for inkjet printers; in particular, the ink set comprising a deep color ink and a light color ink.

2. Description of the Prior Art

Inkjet printing technique has been developed for several years. It is inexpensive, quiet, and with printing quality of colorfulness. Moreover, the ink can adhere to different kinds of medium, such as normal plain paper, paper for special printing and slide for printing.

Inkjet printing is similar to conventional printing. The basic ink set is a combination of cyan, magenta, yellow, and black. By modification, the combination can only be three colors including cyan, magenta and yellow to achieve full color effect. Moreover, the color saturation and printing quality can be enhanced by adding colors of light cyan, light magenta, light yellow, gray, green, blue, orange, etc.

Inks used for inkjet printing can be classified as dye-based ink or pigment-based ink according to compositions. The composition of ink is related to the presentation of colors. The dye is easily dissolved in water and presents brighter color. However, it usually has poor light resistance. Because of its good water solubility, the dye has poor water resistance. When the image from dye-based ink contacts water, the dyed ink dissolves again which damages the printing quality. The pigment is insoluble in water and has better water resistance and light resistance, but its color saturation is relative poor. Because the pigment is in particle form, it is hard to be dispersed uniformly and becomes larger particle to damage inkjet heads of printers. Therefore, a good dispersion is an important characteristic of the pigment-based ink.

On the other hand, inks used for inkjet printing can be classified as deep ink or light ink according to lightness. For analyzing the lightness of the inks, generally, the inventors use the method as following:

1. Ink solution dilute to 200 ppm of colorant content
2. Sample holder is quartz based with 0.2 cm thickness (holder thickness not wall thickness)
3. Measure the lightness of diluted ink solution by calorimeter with predetermined light source.

The deeper color has the smaller lightness. For example: the lightness of the black ink is generally smaller than 30, the lightness of the cyan ink is generally in a range 30 to 55, the lightness of the magenta ink is generally in a range 45 to 60, the lightness of the yellow ink is generally higher than 70.

Besides lightness, water resistance and light resistance, the drying speed and ink bleeding also affect printing quality. Fast drying means that the drying time for the ink on the printing medium is short. The drying speed will affect the printing speed of the printer, because the second diagram cannot be printed until the first one is dry. Ink bleeding means the ink spreading out or infiltrating into another color. It is because that the ink cannot cohere efficiently and also because of the capillary effect by the medium fiber. Ink bleeding will seriously damage printing quality.

There are several methods to restrain or retard ink bleeding on the medium. One method is to accelerate the drying speed by adding additives with higher volatility into the ink, such as low carbon-numbers alcohols. The second method is to accelerate the ink penetration on the medium by controlling the physical characters of the ink. This method not only makes the ink dry fast, but also restrains bleeding. The third method is to produce a wall to prevent infiltrating from one color into another. The wall can be produced by chemical reactions of two colors which contacting each other. The other method to retard bleeding is to add an effective surfactant into the ink to decreases the surface tension resulting in fast dry and printing speed.

Surfactant is commonly classified as cationic, ionic, non-ionic and amphoteric. Non-ionic surfactant has both hydrophilic and lipophilic sides, and is dissolved easily. In order to estimate its hydrophilic and lipophilic characters of the non-ionic surfactant, the Hydrophilic Lipophilic Balance (HLB) value is used. However, the algorithm for HLB value has not yet unified. The following is a common formula to calculate HLB.

$$[(\text{molecular weight of the hydrophilic composition})/(\text{total molecular weight})] \times 20 \qquad \text{Formula 1:}$$

According to Formula 1, the HLB value is ranged from 0 to 20. The higher the HLB value, the stronger the hydrophile character, and vice versa. By adding the surfactant into the ink, solubility of water and oil can be controlled and the surface tension of the ink can be adjusted.

Moreover, in the common desktop inkjet printing system, the color inks is mostly dye-based inks for enhancing the color saturation of image, and making images lighter. The black dye-based ink becomes less popular and is substituted by pigment-based ink, because the images with pigment-based ink can last longer. Because of the difference between dye and pigment, printing qualities of different ink sets are different.

Therefore, it is needed to accelerate the printing speed and improve printing quality. How to make a better combination of the deep/light inks, dyed/pigmented based inks, dyed/dyed based inks, and pigmented/pigmented based inks for inkjet printing becomes an important issue.

SUMMARY OF THE INVENTION

The objective of the present invention is to provide an ink set to solve the above mentioned issue.

The present invention provides an ink set comprising a first ink and at least one second ink for an inkjet printer. The first ink comprises at least one first colorant, a first media and at least one first non-ionic surfactant having a first HLB (Hydrophilic Lipophilic Balance) value. The second ink comprises at least one second colorant for providing corresponding color of the second ink, a second media and at least one second non-ionic surfactant having a second HLB value. The first HLB value is smaller than or equals to the second HLB value. The lightness of the first ink is smaller than the second ink. The media may comprise water, an organic solvent, a humectant, a polymer solvent, a bactericide or a combination of the above-mentioned.

For analyzing the lightness of the inks, generally, the inventors use the method as following:

1. Ink solution dilute to 200 ppm of colorant content
2. Sample holder is quartz based with 0.2 cm thickness (holder thickness not wall thickness)
3. Measure the lightness of diluted ink solution by calorimeter with predetermined light source.

Generally, the method defines ink solution only to classify deep or light color. The deeper color has the smaller lightness. For example: the lightness of the black ink is generally smaller than 30, the lightness of the cyan ink is generally in a range 30 to 55, the lightness of the magenta ink is generally in a range 45 to 60, the lightness of the yellow ink is generally higher than 70. According to the present invention, the ink set decreases the drying time, accelerates the printing speed, restrains bleeding, and further improves the printing quality.

The advantage and spirit of the invention may be understood by the following recitations together with the appended drawings.

BRIEF DESCRIPTION OF THE APPENDED DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
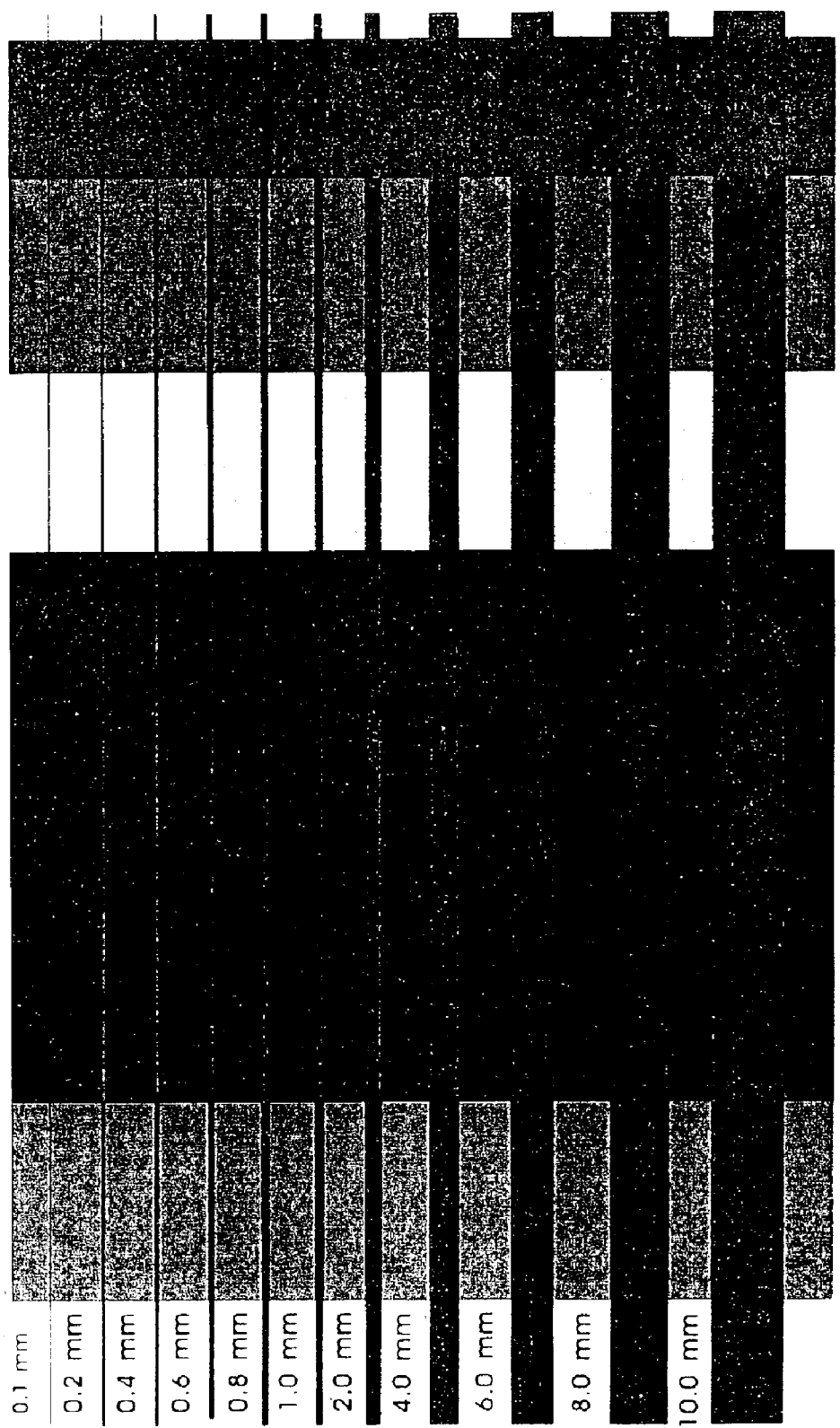
FIG. 1 is a print-out diagram of the experimental result of the 1st embodiment according to the present invention.

The present invention provides an ink set for inkjet printers. The ink set comprises a first ink and at least one second ink. The major composition of the black first ink in the ink set comprises a first media, at least one first colorant, and at least one first non-ionic surfactant. The first media comprises water, organic solvent, humectant, polymer solvent, bactericide, or the combination of above-mentioned. The concentration of the water is ranged from 50 wt % to 95 wt %. The preferred concentration range is 70 wt % to 90wt %. The ink set also comprises a water soluble solvent such as organic solvent and inorganic salt for enhancing the infiltration and dispersion of the ink.

The major components of the second ink comprise a second media, at least one second colorant, and at least one second non-ionic surfactant. The second media may be water, organic solvent, humectant, polymer solvent, bactericide or any combination of those solvents. The concentration of the water is ranged from 50 wt % to 95 wt %. The preferred concentration range is from 70 wt % to 90 wt %. The ink also comprises a water soluble solvent like organic solvent and inorganic salt for enhancing the infiltration and dispersion of the ink.

If the print head exposes to the air for a long time, the ink in the print head is easy to evaporate and produce precipitants, resulting print head clogging and affecting printing quality. For slowing down the evaporation and preventing from clogging, the humectant is added into the ink. The humectant used in the present is the organic solvent with low volatility, such as ethylene glycol, polyethylene glycol, and glycerol. The concentration is below 20 wt %.

Besides the above-mentioned components, the bactericide is added to prevent the bacteria growing in the ink. The buffer is added to make the first colorant or the second colorant within a preferred pH value, and the ink can show preferred colors. Other additives can also be added for better light resistance and weather resistance.

In this invention, the first non-ionic surfactant added in the first ink has a first hydrophilic lipophilic balance (HLB) value. The second non-ionic surfactant added in second ink has a second HLB value. The first HLB value must be smaller than or equal to the second HLB value. The calculation of the HLB value of the non-ionic surfactant is the same as Formula 1 described above. The lightness of the first ink is lower than the lightness of the second ink. The analyzing method of the lightness is described above. Conventionally, the lightness of the black ink is generally smaller than 30, the lightness of the cyan ink is generally in a range 30 to 55, the lightness of the magenta ink is generally in a range 45 to 60, the lightness of the yellow ink is generally higher than 70. By the criterions of the above mention, the ink set of the invention prevents bleeding between the inks.

The experiment result of the present invention is described as following. In the 1st embodiment of the present invention, the first ink is black pigment-based ink and the at least one second ink are color dyed inks.

Because the pigment has a larger particle size. It precipitates more easily and clogs up the print head. Therefore, the particle size needs to be controlled. The preferred particle size of the pigment is smaller than 1.0 $\mu$m. Also, dispersant and adhesive are used to reduce clogging. The dispersed pigment of the invention can be AcryJet Black 357 (from Rohm & Haas), Bayscipt Black VPSP 20016, Bayscipt Black VPSP 20046(from Bayer AG), LJD-3107, LJD-3207, LJD-3209 (from Sun Chemical), Hostafine T, Hostafine TS, Hostafine PT, (from Clariant GmbH), Cab-O-Jet 200, Cab-O-Jet 300 (from Cabot), BonJet CW-1, BonJet CW-2 (from Orient), etc. The concentration of the black pigmented ink is ranged from 1 wt % to 15 wt %, and the preferred range is from 1 wt % to 8 wt %.

The surfactant in the black pigment-based ink can affect the adhesion and the surface tension, and adjust the dispersion and the infiltration of the black pigment-based ink. When adding a surfactant with a proper concentration into black pigment-based ink, inkjeting becomes smoother because of a proper adhesion, and no bleeding because of a proper surface tension. The present invention also improves the dispersion of black pigment-based ink and the penetration of the medium.

The surfactant in the black pigment-based ink is the non-ionic surfactant, the first non-ionic surfactant mentioned above. The first non-ionic surfactant can be Surfynol 104, Surfynol 400 Series (from Air Products), Tergitol 15-S-n Series (from UCC), TRE Series, NP Series (from En Hou), etc. The total adding sum is less than 0.001 wt % to 10 wt %. The preferred concentration range is from 0.001 wt % to 3.5 wt %.

The dye has better water solubility but is easy to crystallize, that will affect the fluency of inkjeting. The dye in this invention comprises Duasyn SF Series (from Clariant GmbH), ProJet Series (from Avecia), Bayscipt Series (from Bayer AG), Experimental PC Series, Access Series, Palmer Series, Liquitant Series (from Milliken Chemical), Y1189, Y104, Y178, M377, M1114 (from Ilford), Water Color Series (from Orient), Basacid Series (from BASF), etc. The concentration -is ranged from 0.5 wt % to 14 wt %. The preferred concentration range is from 1 wt % to 7 wt %.

The surfactant in the dye-based ink of the invention is the non-ionic surfactant, the second non-ionic surfactant mention above. The second non-ionic surfactant can be chosen from the first non-ionic surfactants mentioned before. The total surfactant added is usually less than 0.001 wt % to 10 wt %. The preferred concentration is ranged from 0.001 wt % to 3.5 wt %.

In this invention, the first non-ionic surfactant added in the black pigment-based ink has a first hydrophilic lipophilic balance (HLB) value. The second non-ionic surfactant added in non-black dye-based ink has a second HLB value. The first HLB value must be smaller than or equal to the second HLB value. The calculation of the HLB value of the non-ionic surfactant is the same as Formula 1 described above. The ink set of the invention prevents bleeding between the inks.

The embodiments of the present invention and its corresponding contrast are used in a same inkjet printer, and exported on a same medium to compare with each other. Please refer to Table 1(a), Table 1(b), Table 1(c) and Table 1(d). Table 1(a) Table 1(b), Table 1(c) and Table 1(d) list the compositions of the cyan dyed ink, magenta dyed ink, yellow dye-based ink, and black pigment-based ink, respectively, in the 1st embodiment of the invention. Table 1(a) to Table 1(d) are the ink set of the black pigment-based ink and the non-black dye-based ink in the 1st embodiment of this present invention. The non-black dye-based ink of the ink set comprises three kinds of ink, which are cyan dye-based ink, magenta dye-based ink, and yellow dye-based ink.

Please refer to Table 1(a), the composition of cyan dye-based ink. The dye is Bayscript Cyan BA liq (from Bayer AG), and the concentration is 4 wt %. The humectant is Propene Glycol (from Adrich), and the concentration is 10 wt %. The organic solvent is 2-pyrrolidone (from Adrich), and the concentration is 1.5 wt %. The polymer solvent is Polyethylene Glycol 900 (from Adrich), and the concentration is 6 wt %. The surfactant is Tergitol 15-S-5(from UCC) with the HLB value ats 10.6, and the concentration is 1 wt %. The bactericide is Mergal K7 (from Clariant), and the concentration is 0.5 wt %. Finally, the concentration of deionized water is 77 wt %.

Please refer to Table 1(b) and Table 1(c), the composition of the magenta dye-based ink and the composition of the yellow dye-based ink, respectively. The compositions of the magenta dye-based ink and the yellow dye-based ink are similar to the composition of cyan dye-based ink shown in Table 1(a), but slightly different in dye. The dye of the magenta dye-based ink is Bayscript Magenta VPSP 25032 (from Bayer AG). The dye of the yellow dye-based ink is Bayscript Yellow GGN (from Bayer AG).

Please refer to Table 1(d), the composition of the black pigment-based ink. The composition of the black pigment-based ink is also similar to the three kinds of dye-based ink, but slightly different in the pigment and surfactant. The pigment is Bayscript Black VPSP 20016 (from Bayer AG). The surfactant is Surfynol 420 (from Air Products) with the HLB value of 4.

TABLE 1(a)

The cyan dye-based ink in the 1st embodiment
Cyan Dye-based Ink

| Composition | Chemical Compound | Concentration (wt %) |
|---|---|---|
| Dye | Bayscript Cyan BA liq (from Bayer AG) | 4 |
| Humectant | Propene Glycol (from Adrich) | 10 |
| Organic Solvent | 2-pyrrolidone (from Adrich) | 1.5 |
| Polymer Solvent | Polyethylene Glycol 900 (from Adrich) | 6 |
| Surfactant | Tergitol 15-S-5 (from UCC, HLB value:10.6) | 1 |
| Bactericide | Mergal K7 (from Clariant) | 0.5 |
| Solvent | Deionized Water | 77 |

TABLE 1(b)

The magenta dye-based ink in the 1st embodiment
Magenta Dye-based Ink

| Composition | Chemical Compound | Concentration (wt %) |
|---|---|---|
| Dye | Bayscript Magenta VPSP 25032 (from Bayer AG) | 4 |
| Humectant | Propene Glycol (from Adrich) | 10 |
| Organic Solvent | 2-pyrrolidone (from Adrich) | 1.5 |
| Polymer Solvent | Polyethylene Glycol 900 (from Adrich) | 6 |
| Surfactant | Tergitol15-S-5 (from UCC, HLB value: 10.6) | 1 |
| Bactericide | Mergal K7 (from Clariant) | 0.5 |
| Solvent | Deionized Water | 77 |

TABLE 1(c)

The yellow dye-based ink in the 1st embodiment
Yellow Dye-based Ink

| Composition | Chemical Compound | Concentration (wt %) |
|---|---|---|
| Dye | Bayscript Yellow GGN (from Bayer AG) | 4 |
| Humectant | Propene Glycol (from Adrich) | 10 |
| Organic Solvent | 2-pyrrolidone (from Adrich) | 1.5 |
| Polymer Solvent | Polyethylene Glycol 900 (from Adrich) | 6 |
| Surfactant | Tergitol 15-S-5 (from UCC, HLB: 10.6) | 1 |
| Bactericide | Mergal K7 (from Clariant) | 0.5 |
| Solvent | Deionized Water | 77 |

TABLE 1(d)

The black pigment-based ink in the 1st embodiment
Black Pigment-based Ink

| Composition | Chemical Compound | Concentration (wt %) |
|---|---|---|
| Dye | Bayscript Black VPSP 20016 (from Bayer AG) | 4 |
| Humectant | Propene Glycol (from Adrich) | 10 |
| Organic Solvent | 2-pyrrolidone (from Adrich) | 1.5 |

TABLE 1(d)-continued

The black pigment-based ink in the 1st embodiment
Black Pigment-based Ink

| Composition | Chemical Compound | Concentration (wt %) |
|---|---|---|
| Polymer Solvent | Polyethylene Glycol 900 (from Adrich) | 6 |
| Surfactant | Surfynol 420 (from Air Products, HLB: 4) | 1 |
| Bactericide | Mergal K7 (from Clariant) | 0.5 |
| Solvent | Deionized Water | 77 |

Please refer to Table 2. Table 2 is the composition and the concentration of the black pigment-based ink in the 2nd embodiment according to the invention. In the 2nd embodiment, the three kinds of non-black dye-based ink of the ink set and their compositions (not listed in Table 2) are the same as those in the 1st embodiment. The composition of the black pigment-based ink in the second embodiment is similar to that in the first embodiment, but slightly different in the surfactant. The surfactant in the black pigment-based ink of the second embodiment is Tergitol 15-S-5 (from UCC) with the HLB value at 10.6.

TABLE 2

The black pigment-based ink in the 2nd embodiment
Black Pigment-based Ink

| Composition | Chemical Compound | Concentration (wt %) |
|---|---|---|
| Dye | Bayscript Black VPSP 20016 (from Bayer AG) | 4 |
| Humectant | Propene Glycol (from Adrich) | 10 |
| Organic Solvent | 2-pyrrolidone (from Adrich) | 1.5 |
| Polymer Solvent | Polyethylene Glycol 900 (from Adrich) | 6 |
| Surfactant | Tergitol 15-S-5 (from UCC, HLB: 10.6) | 1 |
| Bactericide | Mergal K7 (from Clariant) | 0.5 |
| Solvent | Deionized Water | 77 |

Please refer to Table 3. Table 3 is the composition of the 1st contrast to the 1st and 2nd embodiments of the present invention. The 1st contrast has the same three kinds of non-black dye-based ink and compositions as those in the embodiments of the present invention, details referring to Table 1(a)–(c). The composition of the black pigment-based ink of the 1st contrast is similar to those of the two embodiments. The only difference is that its surfactant is Surfynol 485W (from Air Products) with the HLB value at 17.

TABLE 3

The 1st contrast of the black pigmented ink
Black Pigmented Ink

| Composition | Chemical Compound | Concentration (wt %) |
|---|---|---|
| Dye | Bayscript Black VPSP 20016 (from Bayer AG) | 4 |
| Humectant | Propene Glycol (from Adrich) | 10 |
| Organic Solvent | 2-pyrrolidone (from Adrich) | 1.5 |
| Polymer Solvent | Polyethylene Glycol 900 (from Adrich) | 6 |
| Surfactant | Surfynol 485W (from Air Products, HLB: 17) | 1 |
| Bactericide | Mergal K7 (from Clariant) | 0.5 |
| Solvent | Deionized Water | 77 |

Among the 1st and the 2nd embodiments, and the 1st contrast ink sets, the difference is the surfactant of the black pigment-based ink. In the 1st and the 2nd embodiments, the HLB value of the surfactant in the black pigment-based ink is smaller than or equal to the HLB value of the surfactant in the non-black dye-based ink. In the 1st contrast, the HLB value of the surfactant in the black pigment-based ink is larger than the HLB value of the surfactant in the non-black dye-based ink. Therefore, the variable is controlled by the HLB value. The characteristics of the invention become obvious by minimizing the variable.

Figure 2:
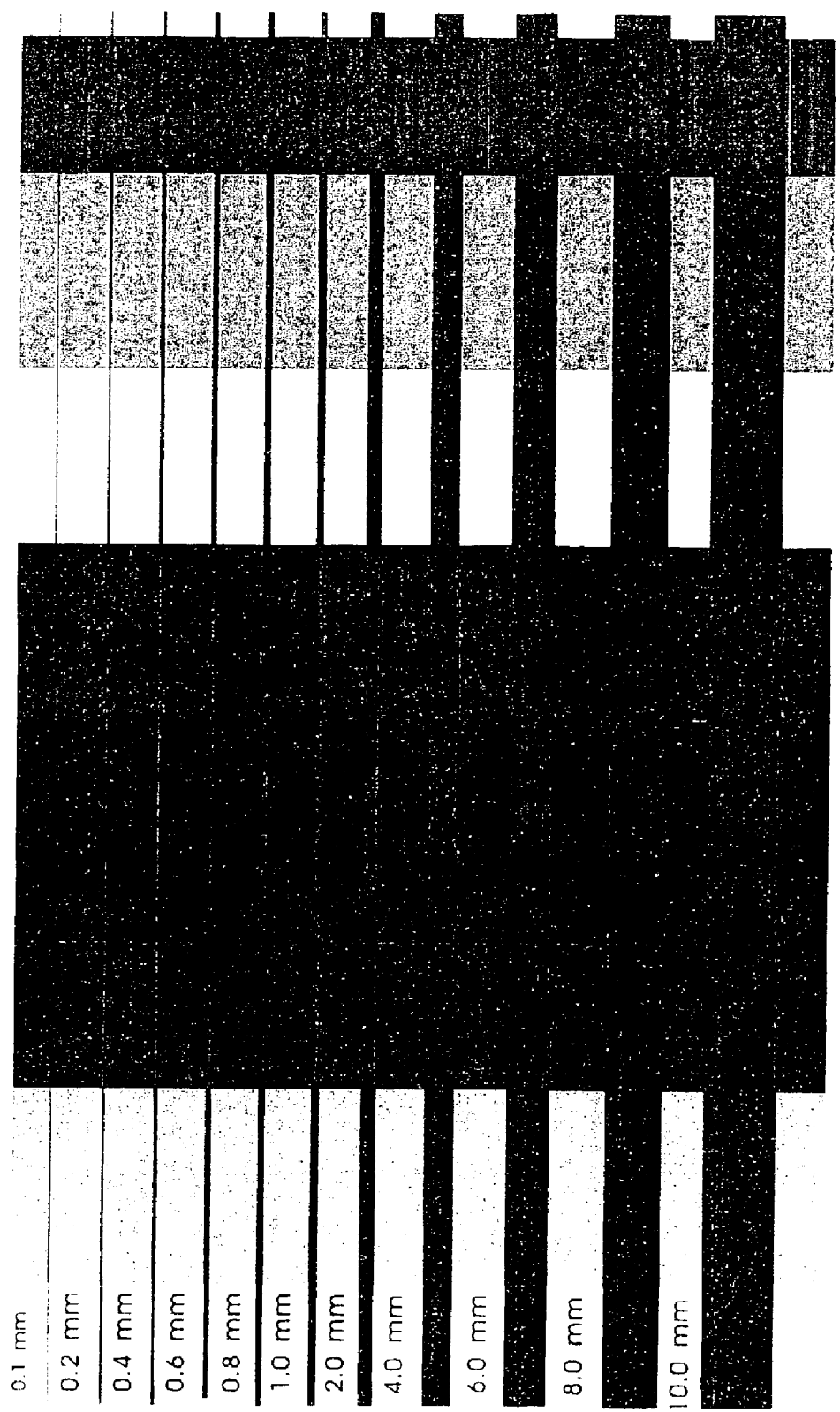
FIG. 2 is a print-out diagram of the experimental result of the 2nd embodiment according to the present invention.
Figure 3:
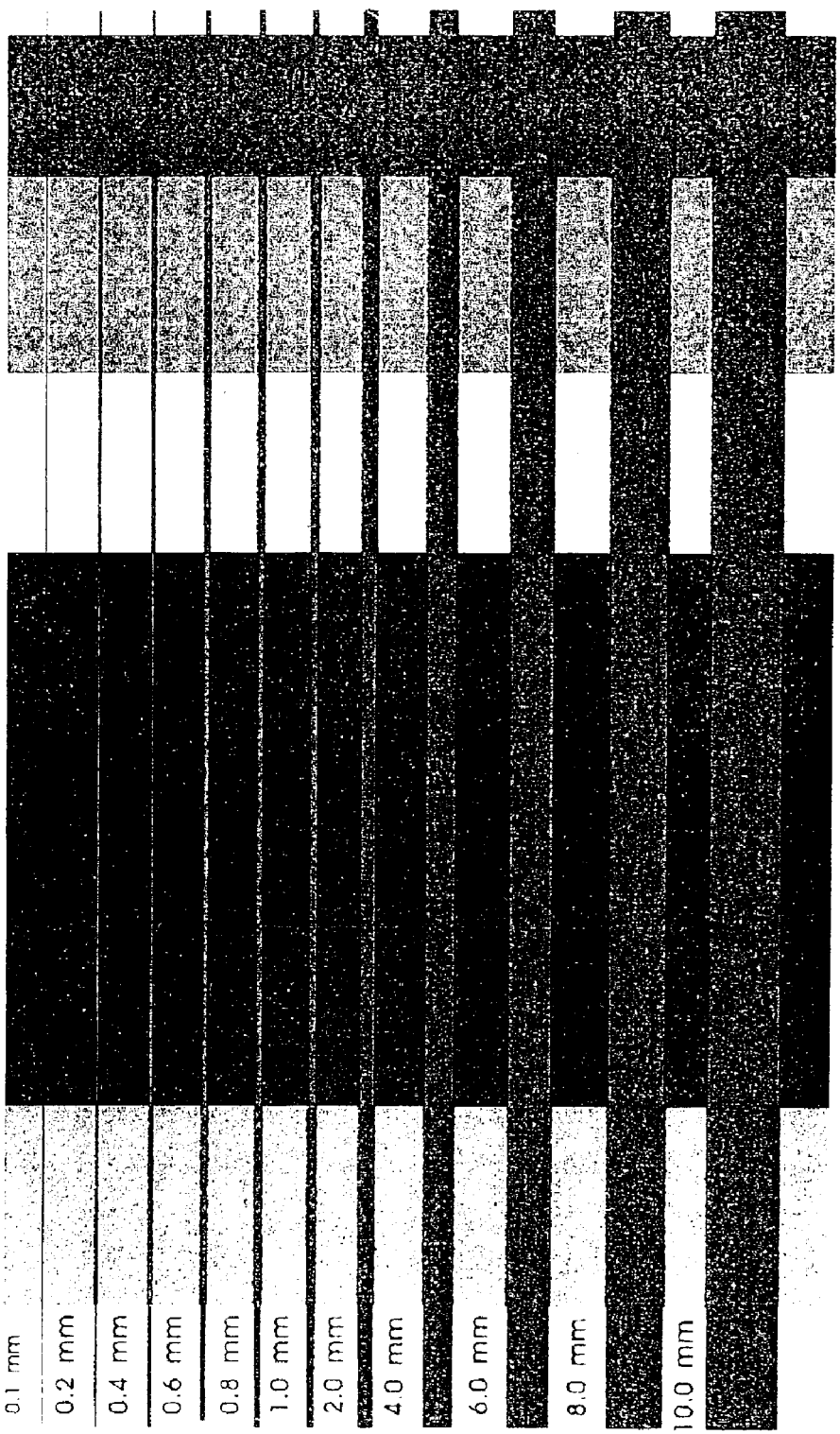
FIG. 3 is a print-out diagram of the experimental result of the 1st contrast according to the present invention.

Please refer to FIG. 1, FIG. 2, FIG. 3 and Table 4. FIG. 1 is a print-out diagram of the experimental result of the 1st embodiment according to the present invention. FIG. 2 is a print-out diagram of the experimental result of the 2nd embodiment according to the present invention. FIG. 3 is a print-out diagram of the experimental result of the 1st contrast according to the present invention. Table 4 is the result of the 1st experiments. These result diagrams are made by the same inkjet printer (from HP930C, the ink cartridge is HP C6578 & 51645), and the same medium (from Plain paper 70 gsm). By Comparing the three diagrams, there is no bleeding between the pigment-based ink and the dye-based ink in the first and the second embodiments. However, bleeding occurs in the contrast. The results of the 1st experiment are summarized in Table 4.

TABLE 4

The results of the 1st experiment

| | HLB value | Restrain Bleeding | Fast Dry |
|---|---|---|---|
| The 1st Embodiment | 4 | yes | yes |
| The 2nd Embodiment | 10.6 | yes | yes |
| The 1st Contrast | 17 | no | yes |

According to the present invention, proper non-ionic surfactants are added into the black pigment-based ink and the non-black dye-based ink. The HLB value of the surfactant in the black pigment-based ink is smaller than or equals to the HLB value of the surfactant in the non-black dye-based ink. Such ink set decreases the drying time, accelerates the printing speed, restrains bleeding, and further improves the printing quality.

In the 3rd embodiment of the present invention, the first ink is black dye-based ink and the at least one second ink are color dye-based inks. The difference between the 1st embodiment and the 2nd embodiment is the first colorant of the first ink. The 1st and 2nd embodiments are black pigment-based ink and the 3rd embodiment is black dye-based ink. The followings just describes the difference between the embodiments.

The black dye in 3rd embodiment comprises PRO-JET FAST BLACK2 LIQUID (from Avecia), PRO-JET FAST BLACK 2CF2 LIQUID (from Avecia), PRO-JET FAST BLACK CN LIQUID (form Avecia), Duasyn Black NB-SF liq. (from Clariant), Duasyn Black SU-SF liq. (from Clariant), Duasyn Black BL-SF liq. (from Clariant), Duasyn Direktschwarz HEF-SF (from Clariant), Bayscript Black SP Liq. (from Bayer), Bayscript Black BS Liq. (from Bayer), Water Black 100L (from Orient), BonJet814L (from Orient), Basacid Black X34 (from BASF), Basacid Black X38 (from BASF), Basacid Black X40 (from BASF), K1334L (from ILFORD), etc. The concentration of the dyed ink is ranged from 0.5 wt % to 14 wt %. The preferred concentration range is from 1 wt % to 7 wt %.

Please refer to Table 5, the composition of the black dye-based ink. The composition of the black dye-based ink is also similar to the three kinds of dye-based ink, but slightly different in the black dye and surfactant. The black dye is ProJet Black CN liquid (from Avecia). The surfactant is Surfynol 104E (from Air Products) with the HLB value of 4.

TABLE 5

The black dye-based ink in the 3rd embodiment
Black Dye-based Ink

| Composition | Chemical Compound | Concentration (wt %) |
|---|---|---|
| Dye | ProJet Black CN liquid (from Avecia) | 4 |
| Humectant | Propene Glycol (from Adrich) | 10 |
| Organic Solvent | 2-pyrrolidone (from Adrich) | 1.5 |
| Polymer Solvent | Polyethylene Glycol 900 (from Adrich) | 6 |
| Surfactant | Surfynol 104E (from Air Products, HLB value: 4) | 1 |
| Bactericide | Mergal K7 (from Clariant) | 0.5 |
| Solvent | Deionized Water | 77 |

Please refer to Table 6, the composition of the black dye-based ink in the 4th embodiment. The composition of the black dyed ink in the 4th embodiment is also similar to the composition of black dye-based ink in the 3rd embodiment, but slightly different in the surfactant. The surfactant is Surfynol 420 (from Air Products) with the HLB value of 4.

TABLE 6

The black dye-based ink in the 4th embodiment
Black Dye-based Ink

| Composition | Chemical Compound | Concentration (wt %) |
|---|---|---|
| Dye | ProJet Black CN liquid (from Avecia) | 4 |
| Humectant | Propene Glycol (from Adrich) | 10 |
| Organic Solvent | 2-pyrrolidone (from Adrich) | 1.5 |
| Polymer Solvent | Polyethylene Glycol 900 (from Adrich) | 6 |
| Surfactant | Surfynol 420 (from Air Products, HLB value: 4) | 1 |
| Bactericide | Mergal K7 (from Clariant) | 0.5 |
| Solvent | Deionized Water | 77 |

Please refer to Table 7, the composition of the black dye-based ink in the 5th embodiment. The composition of the black dye-based ink in the 5th embodiment is also similar to the composition of black dyed ink in the third embodiment, but slightly different in the surfactant. The surfactant is Tergitol 15-S-5 (from UCC) with the HLB value of 10.6.

TABLE 7

The black dyed ink in the 5th embodiment
Black Dyed Ink

| Composition | Chemical Compound | Concentration (wt %) |
|---|---|---|
| Dye | ProJet Black CN liquid (from Avecia) | 4 |
| Humectant | Propene Glycol (from Adrich) | 10 |
| Organic Solvent | 2-pyrrolidone (from Adrich) | 1.5 |
| Polymer Solvent | Polyethylene Glycol 900 (from Adrich) | 6 |
| Surfactant | Tergitol 15-S-5 (from UCC, HLB value: 10.6) | 1 |
| Bactericide | Mergal K7 (from Clariant) | 0.5 |
| Solvent | Deionized Water | 77 |

Please refer to Table 8, Table 9 and Table 10. Table 8, Table 9 and Table 10 are the composition of the contrast to the 3rd to 5th embodiments of the present invention. The $2^{nd}$, $3^{rd}$, 4th contrast has the same three kinds of non-black dye-based ink and compositions as those in the embodiments of the present invention, details referring to Table 5~7. The composition of the black dye-based ink of the contrasts is similar to those of the three embodiments. The only difference is that its surfactants are Honon TX-6 (from HOCLEAN) with the HLB value at 11.7, Surfynol 465 (from Air Products) with the HLB value at 13, and Surfynol 485W (from Air Products) with the HLB value at 17.

TABLE 8

The 2nd contrast of the black dye-based ink
Black Dye-based Ink

| Composition | Chemical Compound | Concentration (wt %) |
|---|---|---|
| Dye | ProJet Black CN liquid (from Avecia) | 4 |
| Humectant | Propene Glycol (from Adrich) | 10 |
| Organic Solvent | 2-pyrrolidone (from Adrich) | 1.5 |
| Polymer Solvent | Polyethylene Glycol 900 (from Adrich) | 6 |
| Surfactant | Honon TX-6 (from HOCLEAN, HLB value: 11.7) | 1 |
| Bactericide | Mergal K7 (from Clariant) | 0.5 |
| Solvent | Deionized Water | 77 |

TABLE 9

The 3rd contrast of the black dye-based ink
Black Dye-based Ink

| Composition | Chemical Compound | Concentration (wt %) |
|---|---|---|
| Dye | ProJet Black CN liquid (from Avecia) | 4 |
| Humectant | Propene Glycol (from Adrich) | 10 |
| Organic Solvent | 2-pyrrolidone (from Adrich) | 1.5 |
| Polymer Solvent | Polyethylene Glycol 900 (from Adrich) | 6 |
| Surfactant | Surfynol 465 (from Air Products, HLB value: 13) | 1 |
| Bactericide | Mergal K7 (from Clariant) | 0.5 |
| Solvent | Deionized Water | 77 |

TABLE 10

The 4th contrast of the black dye-based ink
Black Dye-based Ink

| Composition | Chemical Compound | Concentration (wt %) |
| --- | --- | --- |
| Dye | ProJet Black CN liquid (from Avecia) | 4 |
| Humectant | Propene Glycol (from Adrich) | 10 |
| Organic Solvent | 2-pyrrolidone (from Adrich) | 1.5 |
| Polymer Solvent | Polyethylene Glycol 900 (from Adrich) | 6 |
| Surfactant | Surfynol 485W (from Air Products, HLB value: 17) | 1 |
| Bactericide | Mergal K7 (from Clariant) | 0.5 |
| Solvent | Deionized Water | 77 |

Among the 3rd to the 5th embodiments, and the contrasts ink sets, the difference is the surfactant of the black dye-based ink. In the 3rd to the 5th embodiments, the HLB value of the surfactant in the black dye-based ink is smaller than or equal to the HLB value of the surfactant in the non-black dye-based ink. In the contrasts, the HLB value of the surfactant in the black dye-based ink is larger than the HLB value of the surfactant in the non-black dye-based ink. Therefore, the variable is controlled by the HLB value. The characteristics of the invention become obvious by minimizing the variable.

Figure 4:
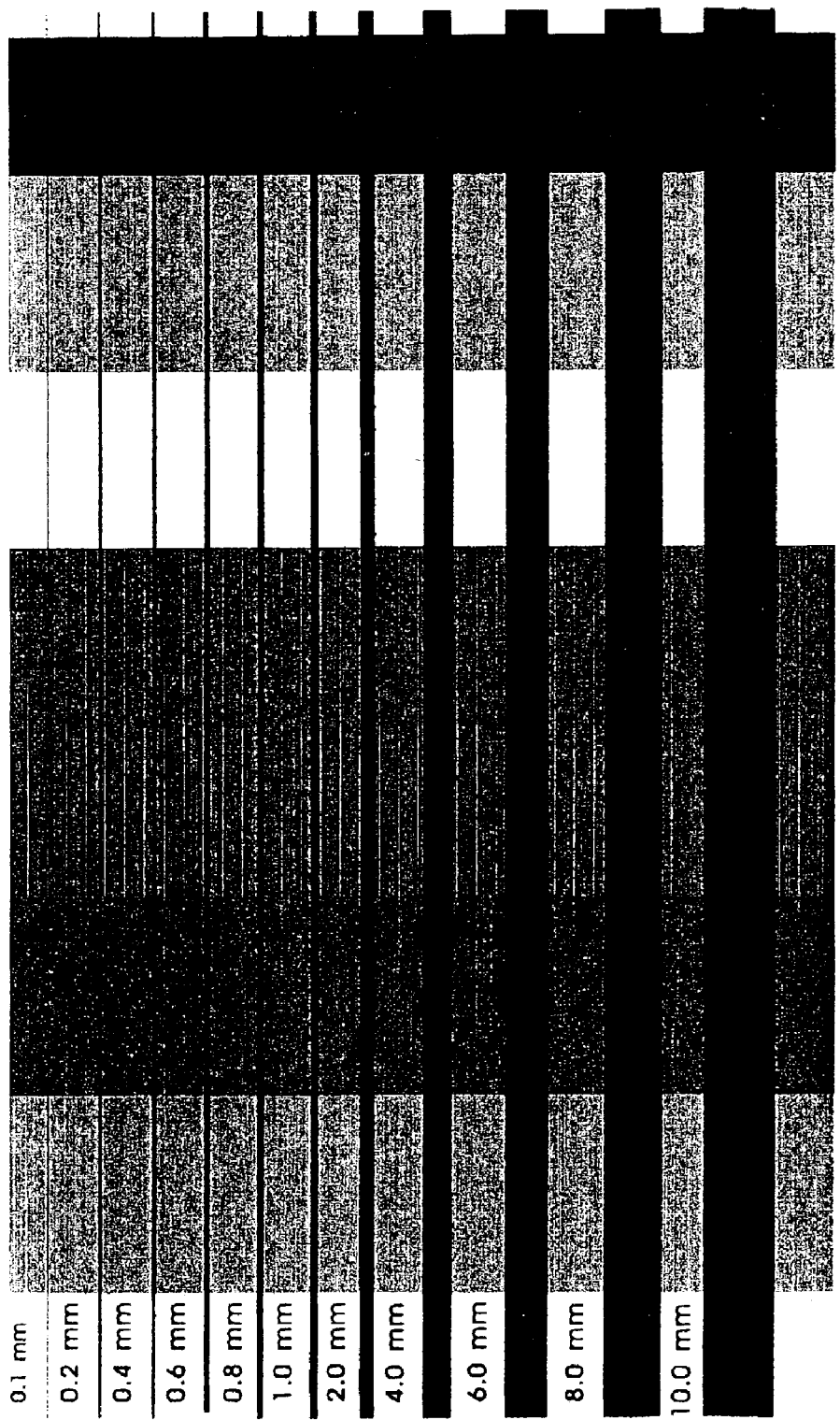
FIG. 4 is a print-out diagram of the experimental result of the 3rd embodiment according to the present invention.
Figure 5:
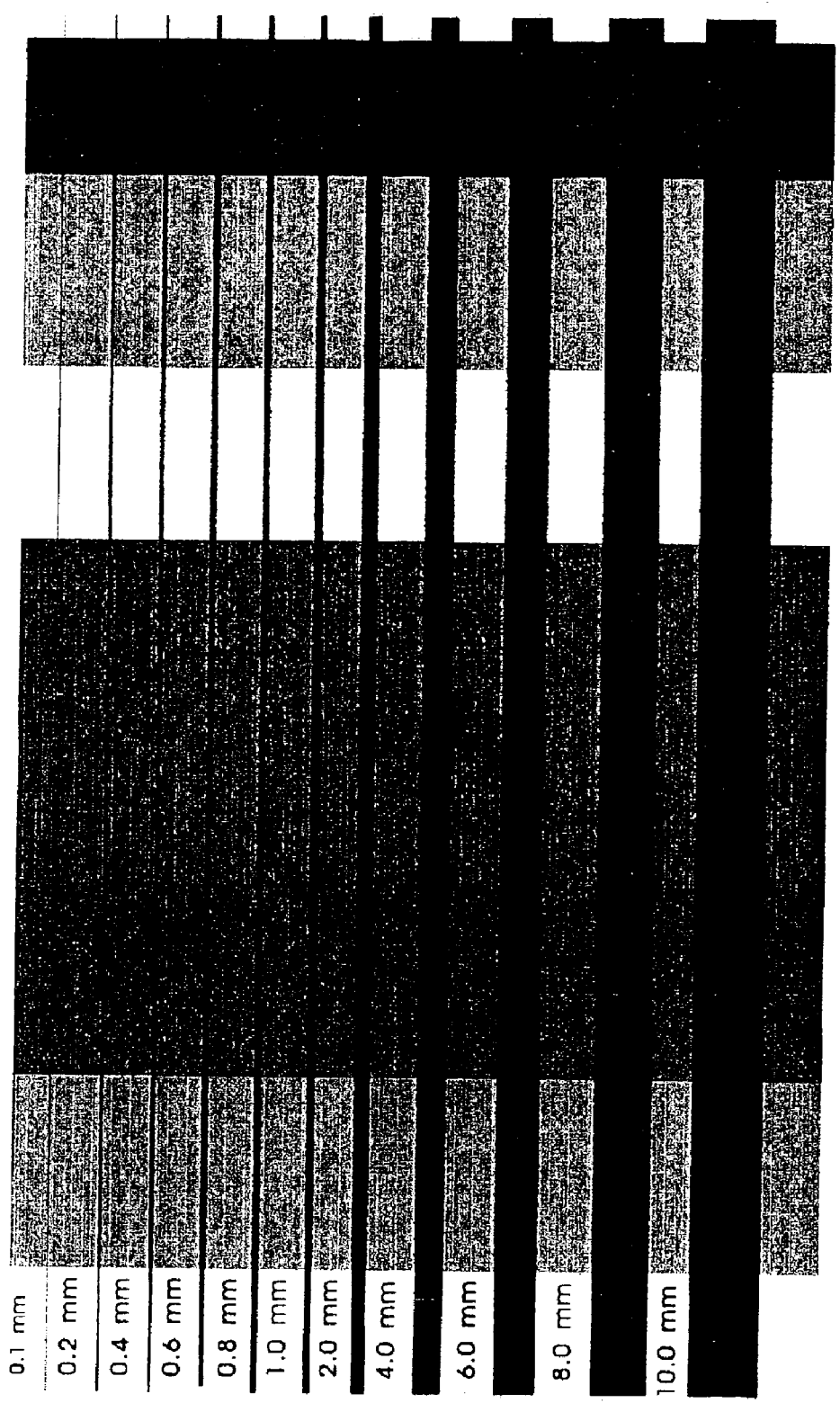
FIG. 5 is a print-out diagram of the experimental result of the 4th embodiment according to the present invention.
Figure 6:
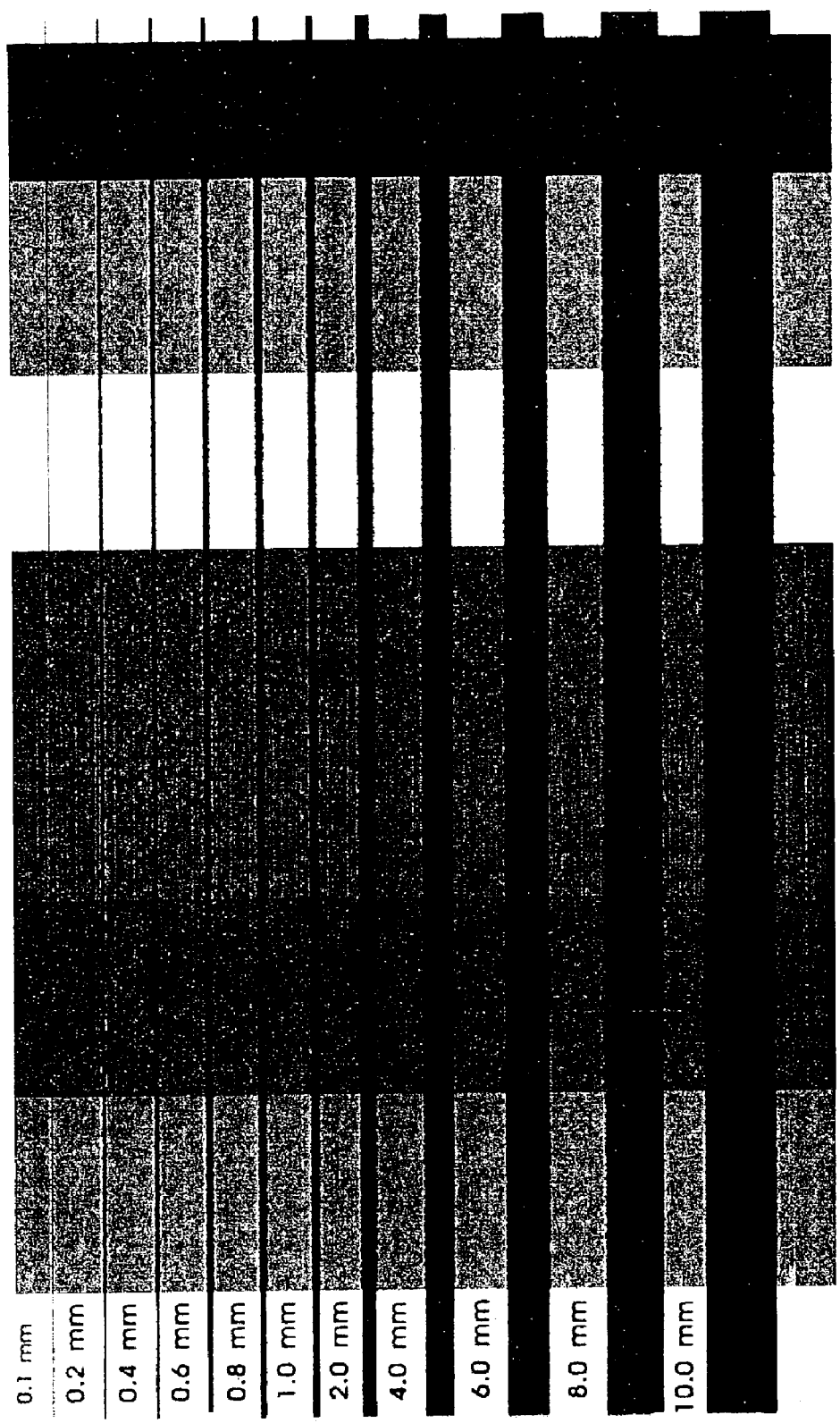
FIG. 6 is a print-out diagram of the experimental result of the 5th embodiment according to the present invention.
Figure 7:
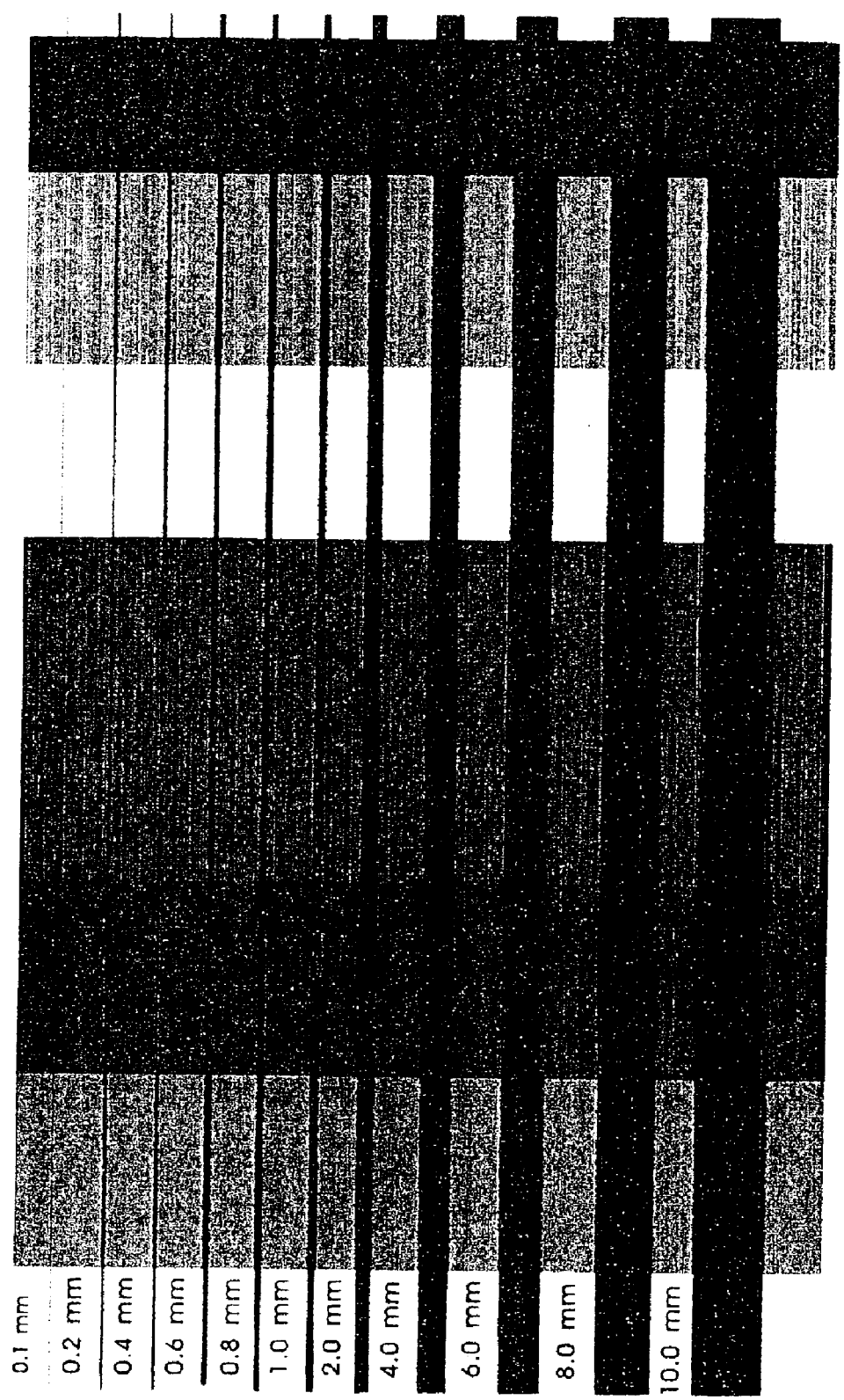
FIG. 7 is a print-out diagram of the experimental result of the 2nd contrast according to the present invention.
Figure 8:
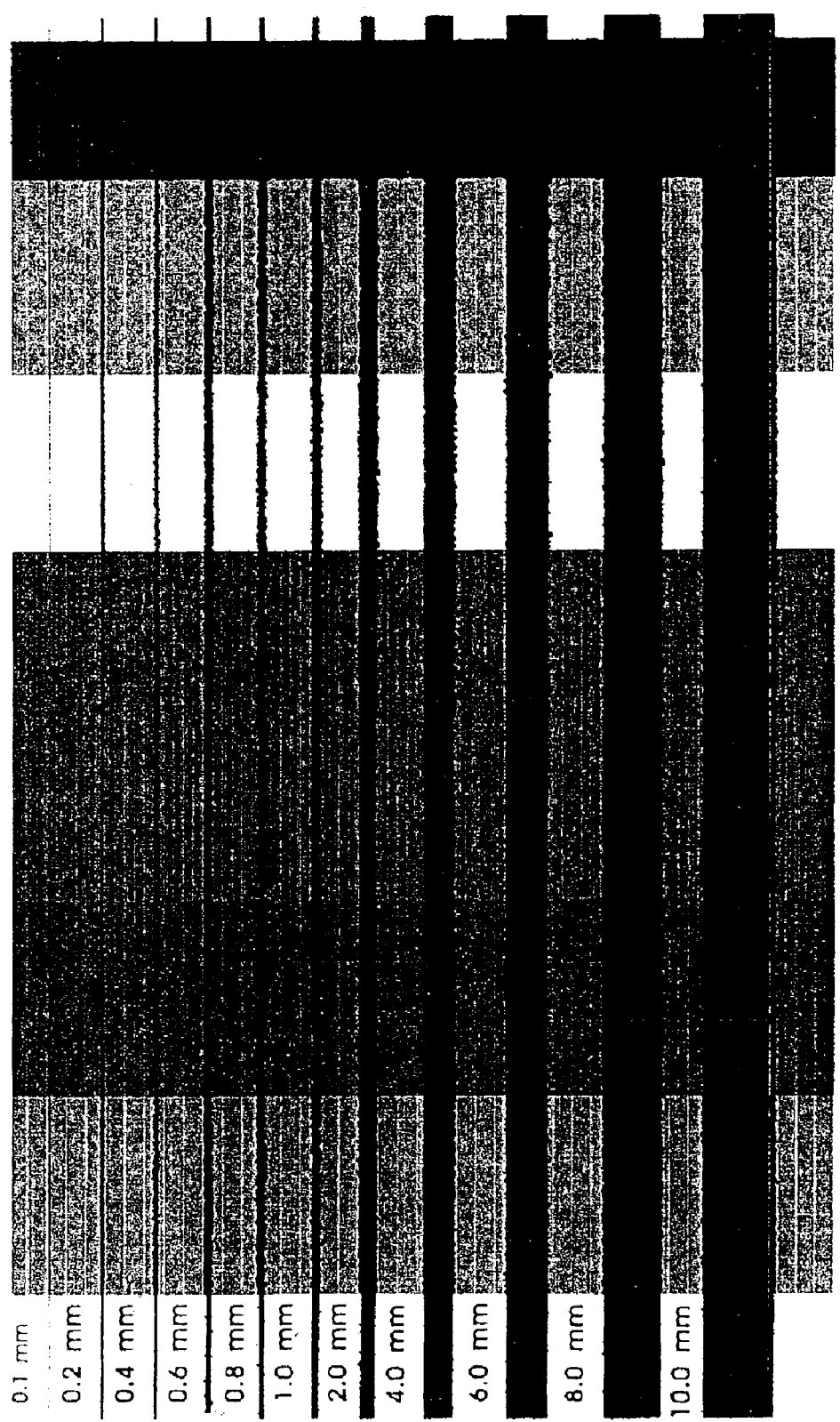
FIG. 8 is a print-out diagram of the experimental result of the 3rd contrast according to the present invention.
Figure 9:
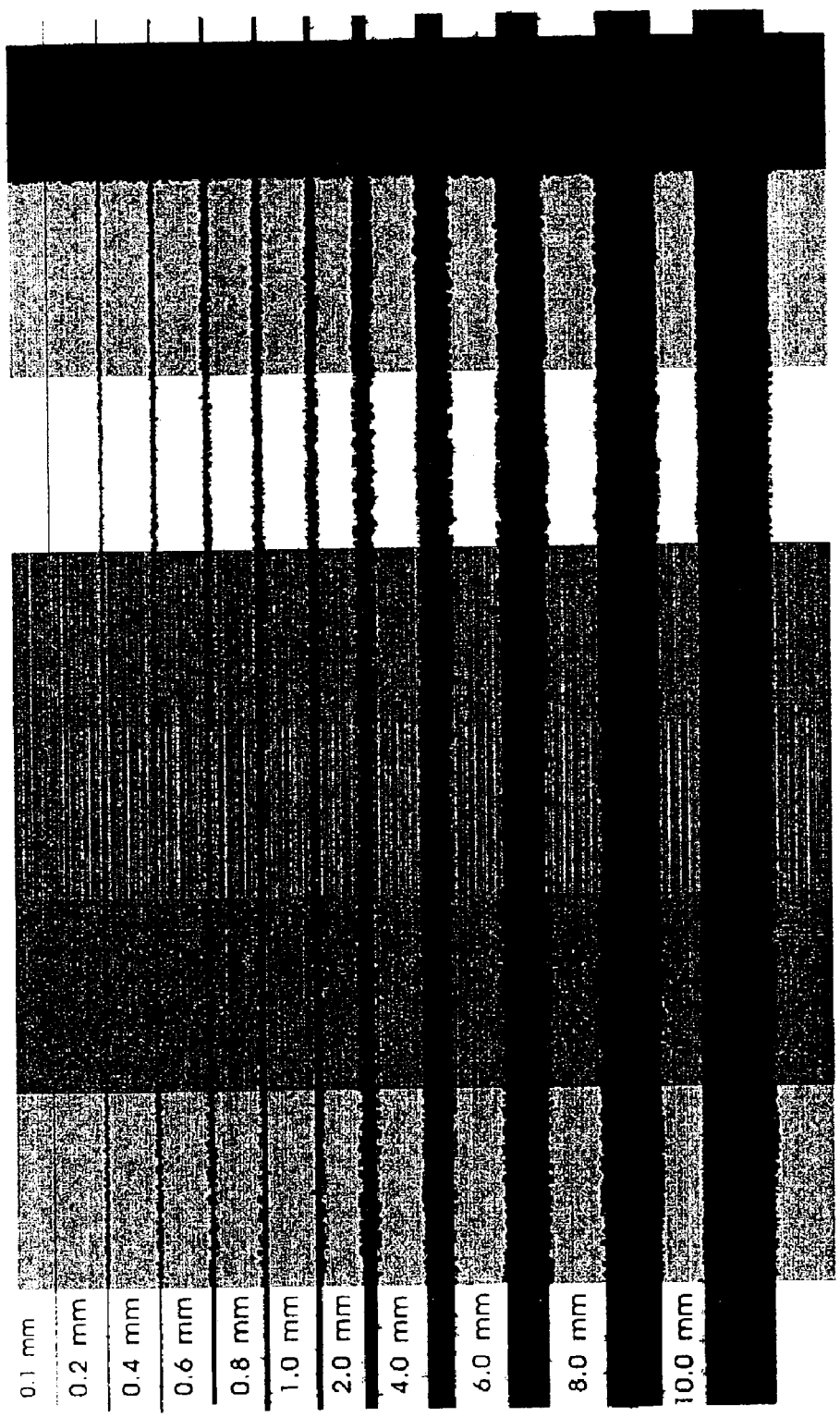
FIG. 9 is a print-out diagram of the experimental result of the 4th contrast according to the present invention.

Please refer to FIG. 4, FIG. 5, FIG. 6, FIG. 7, FIG. 8, FIG. 9 and Table 11. FIG. 4 is a print-out diagram of the experimental result of the 3rd embodiment according to the present invention. FIG. 5 is a print-out diagram of the experimental result of the 4th embodiment according to the present invention. FIG. 6 is a print-out diagram of the experimental result of the 5th embodiment according to the present invention. FIG. 7 is a print-out diagram of the experimental result of the 2nd contrast according to the present invention. FIG. 8 is a print-out diagram of the experimental result of the 3rd contrast according to the present invention. FIG. 9 is a print-out diagram of the experimental result of the 4th contrast according to the present invention. Table 11 is the result of the 2nd experiments. These result diagrams are made by the same inkjet printer (from HP930C, the ink cartridge is HP C6578 & 51645), and the same medium (from Plain paper 70 gsm). By Comparing the six diagrams, there is no bleeding in the 3rd to 5th embodiments. However, bleeding occurs in the 2nd to 4th contrasts. The results of the experiment are summarized in Table 11.

TABLE 11

The results of the experiment

| | HLB value | Restrain Bleeding | Fast Dry |
| --- | --- | --- | --- |
| The 3rd Embodiment | 4 | yes | yes |
| The 4th Embodiment | 4 | yes | yes |
| The 5th Embodiment | 10.6 | yes | yes |
| The 2nd Contrast | 11.7 | no | yes |
| The 3rd Contrast | 13 | no | yes |
| The 4th Contrast | 17 | no | yes |

According to the present invention, proper non-ionic surfactants are added into the black dye-based ink and the non-black dye-based ink. The HLB value of the surfactant in the black dye-based ink is smaller than or equals to the HLB value of the surfactant in the non-black dye-based ink. Such ink set decreases the drying time, accelerates the printing speed, restrains bleeding, and further improves the printing quality.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An ink set for an inkjet printer, comprising:
    at least one first ink comprising:
        at least one pigment for providing a first color of the first ink;
        a first media comprising water;
        at least one first non-ionic surfactant having a first HLB (Hydrophilic Lipophilic Balance) value;
    at least one second ink comprising:
        at least one second colorant for providing a second color of the second ink;
        a second media comprising water; and
        at least one second non-ionic surfactant having a second HLB value, wherein the first HLB value is smaller than or equal to the second HLB value.

2. The ink set of claim 1, wherein the concentration of the at least one pigment ranges from 1 wt % to 15 wt %.

3. The ink set of claim 1, wherein the average particle size of the at least one pigment is less than 1 μm.

4. The ink set of claim 1, wherein the first media comprises at least one additive selected from the group consisting of an organic solvent, a humectant, a buffer and a biocide.

5. The ink set of claim 1, wherein the concentration of the water in the first ink ranges from 50 wt % to 95 wt %.

6. The ink set of claim 1, wherein the concentration of the first non-ionic surfactant ranges from 0.001 wt % to 10 wt %.

7. The ink set of claim 6, wherein the concentration of the first non-ionic surfactant ranges from 0.001 wt % to 3.5 wt %.

8. The ink set of claim 1, wherein the second colorant comprises a dye.

9. The ink set of claim 8, wherein the concentration of the second colorant ranges from 0.5 wt % to 14 wt %.

10. The ink set of claim 1, wherein the second media comprises at least one additive selected from the group consisting of an organic solvent, a humectant, a buffer and a biocide.

11. The ink set of claim 1, wherein the concentration of the water in the second ink ranges from 50 wt % to 95 wt %.

12. The ink set of claim 1, wherein the concentration of the second non-ionic surfactant ranges from 0.001 wt % to 10 wt %.

13. The ink set of claim 12, wherein the concentration of the second non-ionic surfactant ranges from 0.001 wt % to 3.5 wt %.

14. The ink set of claim 1, wherein the lightness of the first ink is lower than the lightness of the second ink.

15. The ink set of claim 1, wherein the first color is black and the second color comprises at least one of cyan, magenta and yellow.

16. A printing method for reducing ink bleeding, comprising:
(a) providing an ink set in an inkjet printer, wherein the ink set comprises:
at least one first ink comprising:
at least one pigment for providing a first color of the first ink;
a first media comprising water;
at least one first non-ionic surfactant having a first HLB (Hydrophilic Lipophilic Balance) value;
at least one second ink comprising:
at least one second colorant for providing a second color of the second ink;
a second media comprising water; and
at least one second non-ionic surfactant having a second HLB value;
wherein the first HLB value is smaller than or equal to the second HLB value; and
(b) ejecting the ink set on a recording medium.

17. The method of claim 16, wherein the concentration of the at least one pigment ranges from 1 wt % to 15 wt %.

18. The method of claim 16, wherein the concentration of the first non-ionic surfactant ranges from 0.001 wt % to 10 wt %.

19. The method of claim 18, wherein the concentration of the first non-ionic surfactant ranges from 0.001 wt % to 3.5 wt %.

20. The method of claim 16, wherein the second colorant comprises a dye.

21. The method of claim 20, wherein the concentration of the second colorant ranges from 0.5 wt % to 14 wt %.

22. The method of claim 16, wherein the concentration of the second non-ionic surfactant ranges from 0.001 wt % to 10 wt %.

23. The method of claim 22, wherein the concentration of the second non-ionic surfactant ranges from 0.001 wt % to 3.5 wt %.

24. The method of claim 16, wherein the lightness of the first ink is smaller than the lightness of the second ink.

25. The method of claim 16, wherein the first color is black and the second color comprises at least one of cyan, magenta and yellow.

26. An ink set for an inkjet printer, comprising:
at least one first ink comprising:
at least one first colorant for providing a black color of the first ink;
a first media comprising water; and
at least one first non-ionic surfactant having a first HLB (Hydrophilic Lipophilic Balance) value;
at least one second ink comprising:
at least one second colorant for providing a non-black color of the second ink;
a second media comprising water; and
at least one second non-ionic surfactant having a second HLB value,
wherein the first HLB value is no greater than the second HLB value.

27. The ink set of claim 26, wherein the first colorant comprises pigment.

28. The ink set of claim 26, wherein the first colorant comprises dye.

29. A printing method of reducing ink bleeding, comprising:
(a) providing an ink set in an inkjet printer, wherein the ink set comprises:
at least one first ink comprising:
at least one first colorant for providing a black color of the first ink;
a first media, comprising water;
at least one first non-ionic surfactant having a first HLB (Hydrophilic Lipophilic Balance) value;
at least one second ink comprising:
at least one second colorant for providing a non-black color of the second ink;
a second media comprising water; and
at least one second non-ionic surfactant having a second HLB value;
wherein the first HLB value is no greater than the second HLB value; and
(b) ejecting the ink set on a recording medium.

30. The method of claim 29, wherein the first colorant comprises pigment.

31. The method of claim 29, wherein the first colorant comprises dye.

* * * * *